(12) United States Patent
Ricke

(10) Patent No.: US 7,278,134 B2
(45) Date of Patent: Oct. 2, 2007

(54) THREE DIMENSIONAL FRAMEWORK FOR INFORMATION TECHNOLOGY SOLUTIONS

(75) Inventor: David Dale Ricke, Tallahassee, FL (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 09/935,318

(22) Filed: Aug. 22, 2001

(65) Prior Publication Data

US 2002/0194147 A1    Dec. 19, 2002

Related U.S. Application Data

(60) Provisional application No. 60/287,271, filed on Apr. 27, 2001.

(51) Int. Cl.
*G06F 9/44* (2006.01)
*G06F 17/30* (2006.01)

(52) U.S. Cl. ............ 717/123; 717/109; 717/113; 717/121; 707/102; 706/50; 706/61

(58) Field of Classification Search ............ 707/203; 717/100–123; 706/50–59
See application file for complete search history.

(56) References Cited

U.S. PATENT DOCUMENTS

| | | | | |
|---|---|---|---|---|
| 5,265,035 A | * | 11/1993 | Reifman et al. | 702/185 |
| 5,386,498 A | * | 1/1995 | Kakefuda | 706/59 |
| 5,598,511 A | * | 1/1997 | Petrinjak et al. | 706/50 |
| 5,794,178 A | * | 8/1998 | Caid et al. | 704/9 |
| 5,893,106 A | * | 4/1999 | Brobst et al. | 707/102 |
| 5,946,694 A | | 8/1999 | Copeland et al. | |
| 5,960,200 A | | 9/1999 | Eager et al. | |
| 5,963,447 A | * | 10/1999 | Kohn et al. | 700/49 |
| 6,012,152 A | * | 1/2000 | Douik et al. | 714/26 |
| 6,134,706 A | | 10/2000 | Carey et al. | |
| 6,199,195 B1 | | 3/2001 | Goodwin et al. | |
| 6,208,345 B1 | | 3/2001 | Sheard et al. | |

(Continued)

FOREIGN PATENT DOCUMENTS

WO    WO 01/14998    3/2001

OTHER PUBLICATIONS

"Progress Software Announces Progress Version 9.1B for Developing E-Business Applications," Sep. 2000.

(Continued)

*Primary Examiner*—Tuan Dam
*Assistant Examiner*—Chuck Kendall
(74) *Attorney, Agent, or Firm*—James D. Palmer; Hoffman, Warnick & D'Alessandro LLC

(57) ABSTRACT

A solution advisor tool for designing an information technology (IT) solution, comprising: (1) a knowledge management system for generating and storing information in a hierarchical format, wherein the knowledge management system includes: (a) a first knowledge base of characteristics; (b) a second knowledge base that manages relationship information regarding the interactions of characteristics and defines all valid characteristic combinations, wherein each valid characteristic combination forms a network unit; (c) a third knowledge base that manages information regarding the interconnectability of network units, wherein a valid combination of network units comprises a configuration; and (d) a fourth knowledge base that manages information regarding sets of possible configurations that can fulfill a predetermined function, wherein each set comprises a cloud; and (2) a design interface system for generating the IT solution.

10 Claims, 13 Drawing Sheets

U.S. PATENT DOCUMENTS 6,628,285 B1 * 9/2003 Abeyta et al. ............. 345/441

OTHER PUBLICATIONS

Pender, Lee, "Faster, Cheaper ERP," CIO Magazine, http://www.cio.com/archive/051501/faster.html, May 15, 2001 issue of CIO Magazine.

Softmatic For Companies of Medium Size and Major Impact, http:www.syscom.plc.uk/products/softmatic/main.htm, date unknown.

"Accounting and Manufacturing Software Selection Tools," The Indiana Small Business Development Corporation, http://www.isbdcorp.org/EC3/tools.htm, copyright 1998.

Product Profile—e-Framework, Integrated Systems & Services Group, http://partners.progress.com, undated.

Product Profile—Darwin, Syscom Plc, http://partners.progress.com, undated.

Product Profile—MXP Enterprise Resource Planning System, Foresight Software, Inc., http://partners.progress.com, undated.

Product Profile—Universal Tools, Universal Solutions, L.C., http://partners.progress.com, undated.

Product Profile—Consulting Services, Innovative Client Servers, http://partners.progress.com, undated.

Product Profile—Consulting Services, N'SOLUTIONS, http://partners.progress.com, undated.

Product Profile—MFG/PRO, QAD Europe GmbH, http://partners.progress.com, undated.

* cited by examiner

| NU Type (Name) | Purpose | Contains Characteristics of Type | Referenced by Configuration Found In | Replaced By |
|---|---|---|---|---|
| 1 (Product application) | End point (product-specific) | All types | | |
| 2 (Product) | Gateway (product-specific) | All types but application | | Type 1 or Type 2 NU |
| 3 (Generic interface) | Gateway | Interface, cable, subnetwork, transport | | Type 1 NU |
| 4 (Generic subnetwork application) | Gateway | Subnetwork, transport, application | Subnetwork cloud | |
| 5 (Generic subnetwork) | Gateway | Subnetwork, transport | | Type 3 NU |
| 6 (Generic transport application) | Gateway | Transport, application | Bridged or transport cloud | |
| 7 (Generic transport) | Gateway | Transport | Application cloud | Type 4 NU |
| 8 (Generic application) | Gateway | Application | Business need cloud | Type 5 NU |
| 9 (Subnetwork cloud) | Cloud | Subnetwork | Bridged or transport cloud | Type 6 NU |
| 10 (Bridged cloud) | Cloud | Subnetwork | Transport cloud | Configuration |
| 11 (Transport cloud) | Cloud | Transport | Application cloud | Configuration |
| 12 (Application cloud) | Cloud | Application | Business need cloud | Configuration |
| 13 (Null) | Represents a cable | Feature | Bridged or transport cloud | Configuration |

*FIG. 8*

THREE DIMENSIONAL FRAMEWORK FOR INFORMATION TECHNOLOGY SOLUTIONS

REFERENCE TO PRIOR APPLICATION

The current application claims priority to now abandoned provisional application Ser. No. 60/287,271, filed on Apr. 27, 2001.

BACKGROUND OF THE INVENTION

1. Field of the Invention

The present invention relates generally to information technology, and more particularly to a framework and tool for providing information technology design solutions.

2. Related Art

Today's information technology products and solutions are becoming increasingly complex and confusing. Customers and solution providers have more product and technology choices than ever before. This complexity will always increase as new products are added to the existing ones. A framework to guide users through these choices is needed. Just as a construction blueprint helps engineers and builders and a city plan helps city planners, an information technology framework can guide its users in building solutions.

Consider: SNA, DHCP, OC-3, TCP/IP, ATM, RS/6000*, FTP, CICS*, 5665-147, XPQR, FTAM, 10BaseFB. This short list of the acronyms is representative of the types of complexities that drive information technology industry insiders crazy. People who build information technology have to put together solutions that actually provide some useful function to the people with the checkbooks.

During the early 1990s, IBM developed a guide called the Networking Blueprint. In 1994 it evolved into the Open Blueprint structure as more standards were developed, the application layer was expanded, and the systems management backplane was added. The Open Blueprint structure is a guide that helps its users choose the technologies and products needed to create a solution. It is very similar to a construction blueprint in that it can help its users make intelligent choices about very complex technologies. It says where to put a particular function, how strong that function should be, and most importantly, it attempts to show how to connect those functions together. It does not contain specific product knowledge, nor does it guide its users in connecting multiple devices together to form a solution.

The IBM Open Blueprint structure 11 (see FIG. 1) has two dimensions: vertical and horizontal. The vertical dimension contains layers that model a device or piece of hardware. This is similar to the standard OSI (Open Systems Interconnection) model. From top to bottom, the layers are: applications and application enabling services 12, distributed systems services 14, common transport semantics 16, transport services 18, subnetwork services 20, and physical network 22. The horizontal dimension contains the choices that can be made in each of the vertical dimensions. For example, the application enabling services layer 12 has choices of remote method invocation (RMI), Post Office Protocol (POP), Open Database Connectivity (ODBC), or HyperText Transfer Protocol/HyperText Markup Language (HTTP/HTML). The transport services layer 18 (logical protocols related to software) has choices of SNA (Systems Network Architecture), TCP/IP (Transmission Control Protocol/Internet Protocol), etc. The subnetwork services layer 20 (physical protocols related to hardware) has choices of: Ethernet, token ring, ATM (asynchronous transfer mode), etc. The physical network layer 22 has copper cabling, fiber, satellite, etc. These groupings allow the acronyms mentioned earlier to be categorized, so that users can make choices as to which function will be used in their solution. To build one facet of one device (to specify the functions that the device would perform in implementing the solution to a particular business need), the user would pick one function for each layer. For example, the user may want a device to run a CICS (Customer Information Control System) application using a TCP/IPtransport protocol over a token ring subnetwork protocol over a physical copper interface.

The Open Blueprint structure allows the user to make choices in each layer independently from the others. Historically, products were built that tied these layers together in a predetermined way. For example, IBM mainframe applications were accessed through a front-end processor that used a transport protocol of SNA over a subnetwork protocol of SDLC (Synchronous Data Link Control) over a physical copper V0.35 physical interface. Today, customers expect vendors to create solutions that allow the customer to choose each layer's value independently of the other layers' values. Customers demand a more open solution. The Open Blueprint structure does not guarantee that there is a specific product or set of products that the user can buy that would implement their choices. Just because a user chooses a set of functions does not mean that those functions will necessarily work together. Users usually try to get concurrence from their vendors that the products will work together and provide the advertised function in an integrated solution.

The basic stack of layers that makes up the Open Blueprint structure 11 is used to build individual devices. In order to build entire solutions of interconnected devices, there is a need to put the Open Blueprint structure into a framework that can expand the scope of the design process to include the entire solution. More detailed customer and product knowledge is needed to make solution design decisions. This customer knowledge is needed to allow a designer to build a solution that is specialized for an individual customer. The product knowledge is needed to allow the designer to be very granular in his or her choices of products (hardware, software, adapter cards, cables) that satisfy the customer's requirements.

SUMMARY OF THE INVENTION

In a first aspect, the invention provides a framework for providing information technology solutions, the framework comprising: a first knowledge base of characteristics that describe products and functions, wherein a combination of products performs a set of functions; a second knowledge base that manages relationship information regarding the interactions of products and defines all valid product combinations, wherein each valid product combination forms a network unit; and a third knowledge base that manages information regarding the interconnectability of network units, wherein a valid combination of network units comprises a configuration.

In a second aspect, the invention provides a solution advisor tool for designing an information technology (IT) solution, comprising: (1) a knowledge management system for generating and storing information in a hierarchical format, wherein the knowledge management system includes: a first knowledge base of characteristics; a second knowledge base that manages relationship information regarding the interactions of characteristics and defines all valid characteristic combinations, wherein each valid characteristic combination forms a network unit; a third knowledge base that manages information regarding the interconnectability of network units, wherein a valid combination of network units comprises a configuration; and a fourth knowledge base that manages information regarding sets of possible configurations that can fulfill a predetermined function, wherein each set comprises a cloud; and (2) a design interface system for designing the IT solution, comprising: a system for specifying the solution using a first cloud; a system for replacing the first cloud with a set of second clouds; a system for replacing a selected cloud with at least one configuration; a system for replacing a selected configuration with at least one network unit; and a system for replacing a generic network unit with a specific network unit.

In a third aspect, the invention provides a program product stored on a recordable medium, which when executed provides a system for generating an information technology solution, comprising: a system for specifying a generic solution using a cloud selected from a plurality of clouds, wherein each cloud provides a set of possible configurations that can fulfill a predetermined function, and wherein each configuration includes a valid set of network units, and wherein each network unit comprises a set of characteristics; a system for replacing the cloud with at least one second cloud, wherein the at least one second cloud includes a more specific set of configuration details; a system for replacing a selected cloud with at least one configuration; a system for replacing a selected configuration with at least one network unit; and a system for replacing a generic network unit with a specific network unit.

In a fourth aspect, the invention provides a solution advisor tool for generating an information technology solution, comprising: a cloud knowledge base that includes a plurality of clouds, wherein each cloud provides a set of possible configurations that can fulfill a predetermined function, and wherein each configuration includes a valid set of network units, and wherein each network unit comprises a set of compatible characteristics; and a system for designing a solution using clouds selected from the cloud knowledge base.

The basic stack of IBM's Open Blueprint is incorporated into a framework that expands the physical network layer into more granular product layers, so that relationships between purchased products and delivered functions can be determined. This allows users to make more thoughtful decisions in a guided approach as they design solutions.

BRIEF DESCRIPTION OF THE DRAWINGS

The preferred exemplary embodiment of the present invention will hereinafter be described in conjunction with the appended drawings, where like designations denote like elements, and:

FIG. 8 depicts a table of network unit types.

DETAILED DESCRIPTION OF THE INVENTION

3-D Framework Overview

Figure 1:
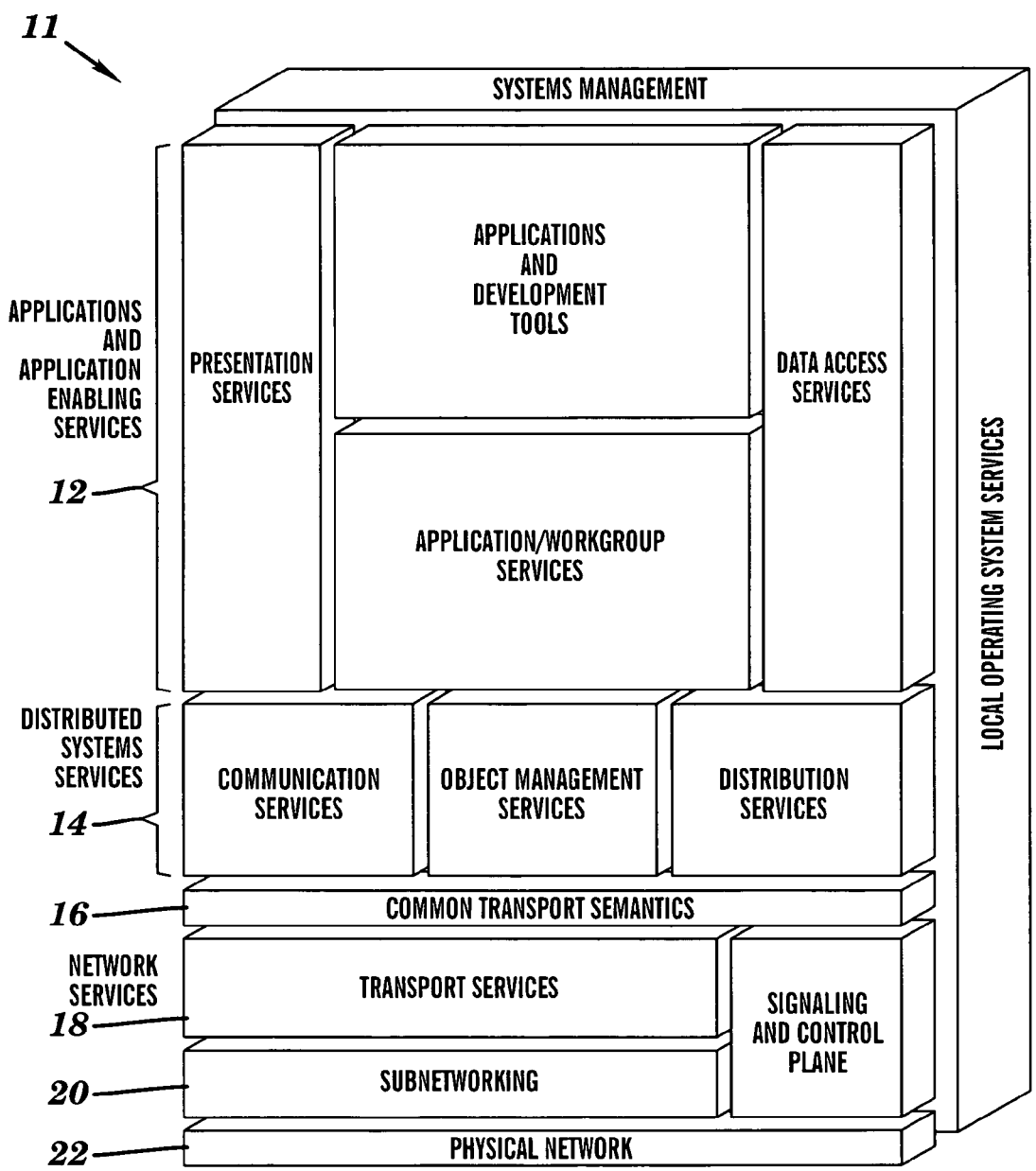
FIG. 1 depicts the IBM Open Blueprint structure.

Whereas the Open Blueprint structure 11 is two-dimensional, the three-dimensional approach provided by the present invention will allow users to build complete detailed solutions. The invention is three-dimensional (3-D) in terms of its ability to help users connect existing 2-D blueprint stacks together into solution strings. A solution string represents all the physical devices that a solution crosses as two end points communicate with each other. Very specific product and customer knowledge is needed in order for multiple stacks to be interconnected to form a solution. Customer-specific business knowledge, standards-based functional knowledge, and vendor-specific product knowledge are all required to create a valid solution. All of this detailed knowledge can be made part of the framework by expanding the existing Open Blueprint structure or stack 11.

The Open Blueprint stack 11 can be placed into an expanded framework stack that includes the customer's business need and the physical network layer's product knowledge. The business need layer at the top of the stack is the reason that this solution is being built. Business needs include customer relationship management (CRM), enterprise resource planning (ERP), and other customer-specific functions, such as "keep track of the customer's purchases" or "print a receipt." The bottom layer of the Open Blueprint structure 11 (physical network layer) can be expanded into product layers to show the detailed products that deliver all of the functions of the higher layers (business need, application, transport protocol, and subnetwork protocol). These product layers will include the hardware, software, adapter cards, cables, and interfaces that customers purchase to build a solution. The products are purchased and installed to build a device that delivers the functions of the stack. The hardware layer represents a product, box, or device. The software is the code or microcode that runs on top of the hardware. The adapter card is usually an add-on to the hardware to extend its function. The cables plug into the interface that is delivered with the hardware or the adapter card. The Open Blueprint structure's distributed systems services layer and applications and application enabling services layer choices are represented by the application that delivers that function. The Open Blueprint structure's common transport semantics layer can be represented by the transport protocol layer in the framework. The extended framework stack, from top to bottom, is shown in Table 1.

TABLE 1

| Extended framework stack | |
| --- | --- |
| Business need | Reason the device is to be purchased; the problem being solved |
| Application | Application that will implement the solution |
| Transport protocol | Software-based protocol to be used |
| Subnetwork protocol | Hardware-based protocol to be used |

TABLE 1-continued

Extended framework stack

| | |
|---|---|
| Cable | Type of cable that will connect to the device |
| Interface | Type of interface on the cable |
| Adapter card | Adapter card that will be installed |
| Software | Software that will support and implement the application |
| Hardware | Hardware that will support the higher-layer functions |

Figure 2:
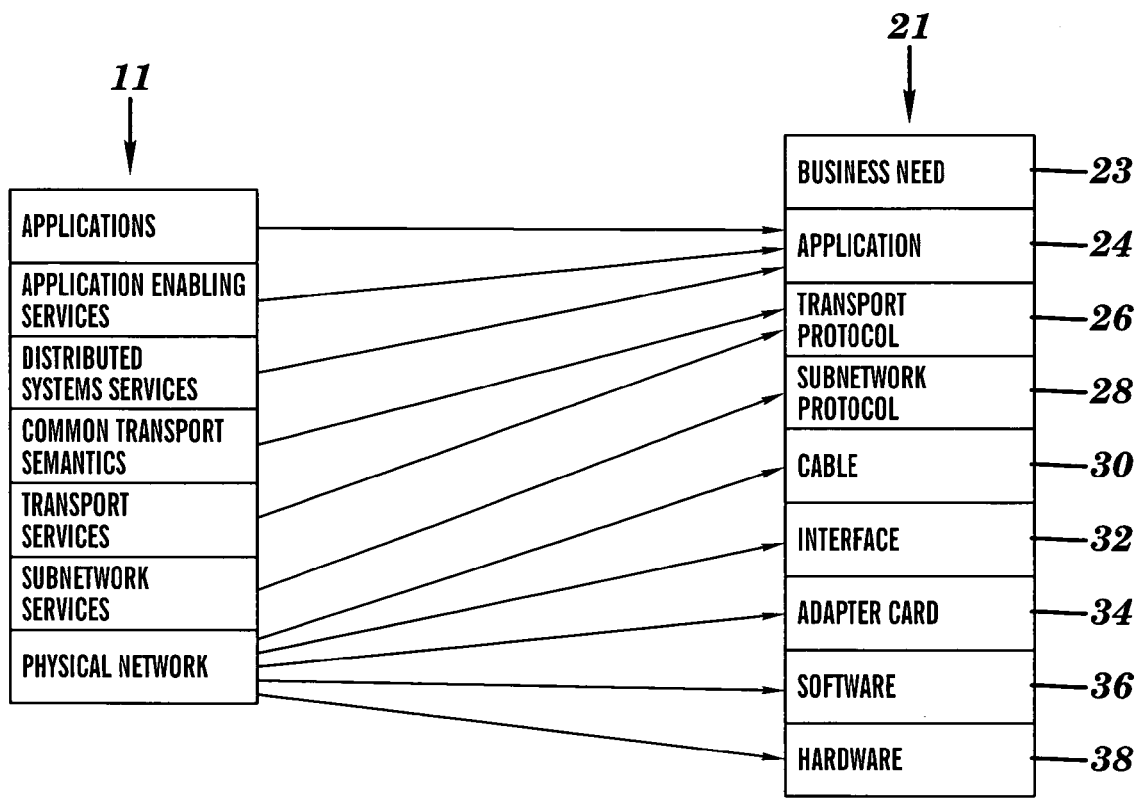
FIG. 2 shows the relationship between the Open Blueprint stack and the 3-D framework stack.

FIG. 2 shows the relationship between the Open Blueprint stack 11 and the 3-D framework stack 21. The main goal of the 3-D framework is to allow users to design end-to-end solutions and select products that meet the requirements of those solutions. Knowledge of the interworkings of a particular piece of application software is beyond the scope of this framework. The 3-D framework relies on knowledge of how standards-based protocols function. Therefore, more emphasis is put on the layers below the application layer. Other frameworks deal with the applications and application enabling services layers.

The nine layers of the 3-D framework stack 21 represent the decision points that a user must pass through to build one device. The nine layers include business need 23, application 24, transport protocol 26, subnetwork protocol 28, cable 30, interface 32, adapter card 34, software 36, and hardware 38. These decisions should be made from the top down, e.g., one should not make a software decision until the application decision is made. The adapter card supports the chosen subnetwork protocol, the software supports the chosen transport protocol, etc. The 3-D framework stack 21 becomes a decision collector as these choices are made. The user may not make every decision. Some are made based on history or the limits of the purchased product. Still others are made by committee or even by use of a dart board. This nine-layer stack is used to instantiate a physical manifestation of the Open Blueprint structure 11 to build real solutions.

This stack of layers represents just one device, and a solution usually requires more than one device. A solution is a concatenation of these framework stacks 21, where devices are connected together using cables. In order for two devices to connect to each other, the interface and cable layers must match. Depending on the function of the devices, other layers-application, transport, and subnetwork-may also have to match. A solution where one device is using token ring cannot directly connect to another device using Ethernet. Similarly, a fiber cable cannot connect to a copper cable. This is analogous to someone trying to speak in Japanese to a listener who understands only English, or someone trying to plug a three-prong grounded electrical plug into a two-prong outlet. None of these examples will work without the use of some "gateway" or interpreter that connects two devices.

End Points and Gateways

There is one last set of concepts to discuss for the solution to be complete: end-point devices and gateway devices. Some stacks act as end points to the solution. The end-point stacks represent the two devices that are to communicate. Common end points are servers, printers, desktop and laptop PCs, mainframes, and Web servers. An example of an end-point stack is a PC running Microsoft Windows and TCP/IP over Ethernet using an RJ45 interface to connect a Category 5 cable to get on the Internet in order to browse a Web application. One selection is made for each layer. Each layer in the stack is filled in by the user as decisions are made. Other stacks are partnered to form gateways. The simplest form of a gateway device connects two devices using similar layer choices. The gateway device can transform one or more of the layers in the stack. For example, a device comprised of two framework stacks could transform the cable type from fiber to copper. Or a device could transform token ring to Ethernet, or HTML to 3270 format (a common screen format for mainframe servers). Common gateways are routers, switches, and hubs. Not all the layers in the gateway stacks must contain values in order to create a solution. Some gateway stacks are not concerned with the higher layers of the stack. For example, a token ring hub device has no concern as to what transport protocol it uses-the hub operates only at the subnetwork layer.

Figure 3:
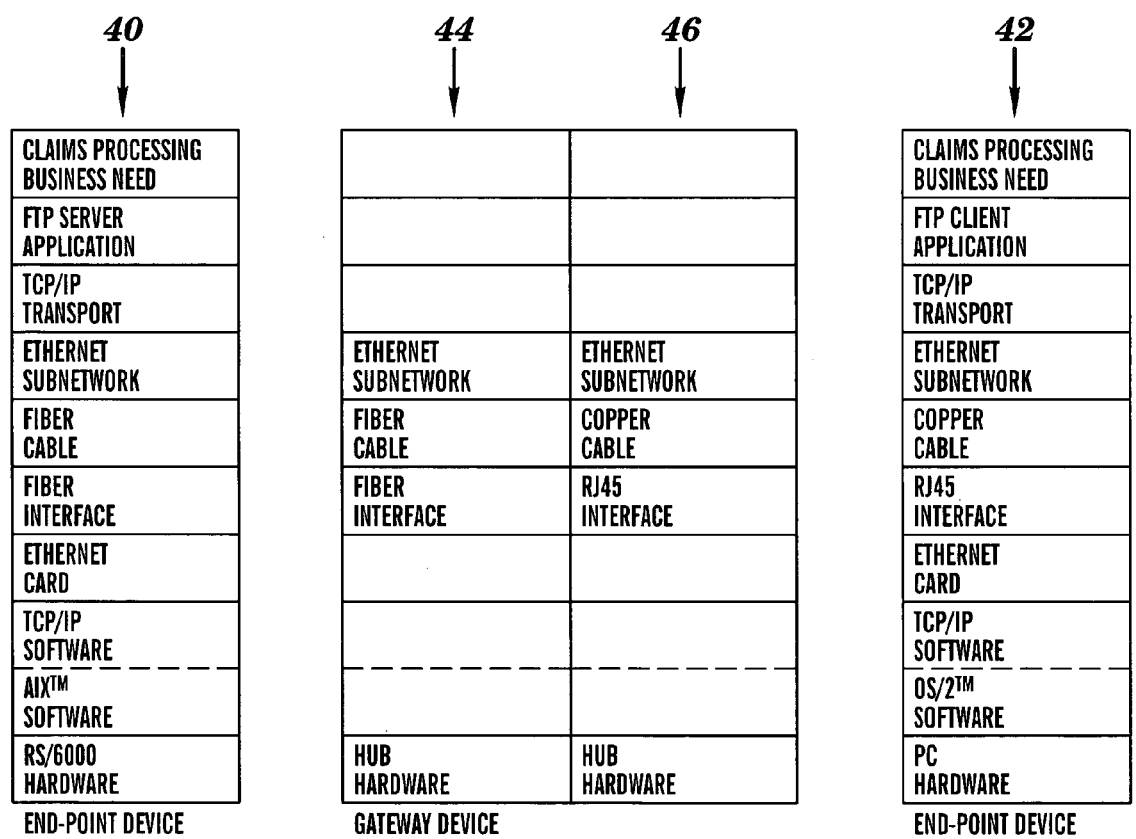
FIG. 3 depicts end-point stacks and gateway stacks.

An example of an actual solution with four connected stacks is shown in FIG. 3. FIG. 3 shows the difference between end-point stacks 40, 42 and gateway stacks 44, 46. Two end-point stacks 40, 42 are used to represent the devices at the ends of the solution. Two gateway stacks 44, 46 are used to represent the one device in the middle of the solution. There is only one physical device in the middle of the solution, but it is represented by two stacks 44, 46 because it requires two interfaces or ports to interconnect the two end points. For example, a user may have a PC client that wants to get information from a RISC (reduced instruction-set computer) System/6000*(RS/6000*) server interconnected with an Ethernet hub. Both end-point stacks 40, 42, the PC and the RS/6000, could use the same application layer of FTP (File Transfer Protocol) and the same transport layer of TCP/IP. All four stacks could use the same subnetwork layer of Ethernet. One end-point 42 and one gateway stack 46 uses copper while the other end-point 40 and gateway stack 44 use fiber. The PC end-point stack 42 would use some PC hardware type with the prerequisite software and an Ethernet adapter card. The RS/6000 server would use a RISC hardware platform and the appropriate TCP/IP software along with an Ethernet adapter card. This is a simple solution, but it shows how the stacks act as decision collectors as these function and product choices are made.

Every device in use in any network is either a gateway or an end-user device, or both. Every solution in use in any organization can be built by connecting the end-user stacks with one or more gateway stacks. Every solution can be described with this set of layers and functions, regardless of the vendor, application, or user. This model can be easily expanded when the next big technology discovery changes the way solutions are designed. A new layer can be inserted where appropriate. Past solutions have all fit into this model. Furthermore, every organization chooses from the same set of products and functions to build solutions. Organizations differ only in how the solutions are built, not in the basic building blocks used to build these solutions.

Designers all choose from the same set of products. Customer networks are comprised of multiple solutions where end-point and gateway devices support multiple solutions at the same time. For example, a network may contain a PC that is used to browse a Web page on the Internet and is also used to sign on to the corporate mainframe server. These are two solutions that share some of the same devices.

Designers of solutions may not be aware that they are making these decisions for every device in their organization, but they are. Some organizations assign these decisions to individual people. Some organizations have entire sections of people to make decisions that fit into just one layer. The complexity and number of choices can be mind-boggling. The Open Blueprint structure and the expanded framework stack are models that can help users make sense of all these choices.

Other industries also use blueprints. We can investigate the transportation industry as an analogy to the information technology industry. There are many similarities, and this analogy may help in understanding the usefulness of a blueprint and how it helps to organize thoughts and decisions.

The transportation industry includes trucking, airlines, shipping, express services, etc. It is similar to the information technology industry because both are concerned about getting information or packages from one point to another. Both industries use a layered approach to design solutions. Both involve a series of locations, connected together. The information technology (IT) industry uses cables, whereas the transportation industry uses roads or airline and shipping routes. Both have terminals (end points), switching stations, and hubs (gateways). Their solutions can be defined as strings of boxes tied together to serve a common purpose.

Table 2 provides a framework stack for three examples in the transportation industry. Starting from the top of the framework stack and working down, examples of values for each layer are provided.

TABLE 2

Using the framework to investigate the transportation industry

| | | | |
|---|---|---|---|
| Business need (the reason the package is being sent) | To deliver a product | To travel for vacation | To deliver the mail |
| Application (the thing being sent) | Bamboo steamer | Family of five | "Dear John" letter |
| Transport protocol (how it is packaged) | Cardboard box | Airplane seats | Plain envelope |
| Subnetwork protocols (the physical medium it travels on) | Truck | Plane | Mail carrier |
| Cable (the surface matter) | Highway | Air | Road or street |
| Interface (the port type) | Warehouse door | Airport runway | Mailbox |
| Adapter card (the doorway type) | Garage door | Airport gate | Loading dock |
| Software (the delivery application) | Shipping/ receiving system | Airline reservation system | Post office tracking system |
| Hardware (the building involved) | Warehouse | Airport | Post office |

Both industries have gateways and end points. An airport is a gateway that allows people to arrive in planes and depart by a different mode of transport, such as a bus or car. A distribution terminal warehouse is a gateway that transforms the shipping material from a truck to a train. We even see examples of encapsulation, as we do in the information technology field. Cars are sometimes encapsulated on railway carriers or ships. Both industries require common cables and protocols on directly connected devices. A car cannot ride directly on a railroad track. A locomotive cannot travel on water. While this analogy may not be exact, it gives a more familiar frame of reference to understand the usefulness of a design framework.

Solution designers and users need assistance in the solution design process because of the complexity and multitude of choices that are available. In a typical customer network, there are hundreds of solutions that need to be designed. Each layer in each device needs to be filled in for every device in every solution, and each solution will have to work concurrently with the others on the same set of products. A three-dimensional approach will help solution designers reach their goals.

The Framework and the Solution Design Process

The two-dimensional Open Blueprint structure (or an analogous architecture) is an integral part of the new framework stack. Framework stacks represent individual devices that make up a customer's solution. A solution is a string of these stacks interconnected with cables. The framework is an architecture that guides solution designers through the confusion of multiple product and functional choices to build customer-specific solutions. The end goal for a solution designer is a valid workable solution. Customers want to know what products to buy and vendors want to know what products to sell. The framework supports intelligence that understands interconnectivity issues between the devices as well as product-specific interoperability issues within a device. It supports the solution design process attributes that follow.

Top-Down Guided Decision-Making Process

A guided design process is necessary to help users make decisions in the appropriate order. It also drastically reduces the number of decisions. Without a guided approach, decisions regarding each device in a solution have to be made one device and one layer at a time. In other words, to fill in each layer of each stack in the solution, the user has to process information and make a separate decision on each layer. In a solution with 20 stacks strung together, users would have to make 180 (20 stacks times 9 layers) separate decisions.

Generic-to-Specific Choices

A guided approach allows users to make generic decisions at the beginning of the design process and specific product decisions at the end of the process. Users cannot make specific, very detailed, product decisions until they have all the information that will affect that decision. Also, a solution design process can help the user to understand the requirements of the next stack in the solution. In other words, users should not make a product or function decision in one stack without looking at the requirements of the stack to which it connects.

Interconnectivity Knowledge

A good solution design process can incorporate the requirements of one device to connect to another device. The framework stacks are connected to each other to form solutions. The process can assist the user in discerning how to connect the stacks together to form a solution. For example, a good design approach can "know" if a stack that represents an IBM mainframe can connect to a stack that represents an IBM multiprotocol router.

Detailed Product Knowledge

Product knowledge is essential to a solution design process. Designers must know the capabilities of a product before they can choose to use it in a solution. A good design approach can guide users to the correct product choices, based on the users' functional requirements. The framework stack has nine layers that include functions and products. A good design approach can determine whether the chosen products will work together. For example, users need assistance to know if SNA transport protocol can run over an ATM subnetwork protocol. The benefits of this solution design process are expanded later in this section.

3-D Decision Clouds

There are six main decision points that a user or designer has to pass through to determine a valid solution: business need, application, transport protocol, subnetwork protocol, interface, and product (software, hardware, adapter cards, cables).

Without the framework, these decisions are made one at a time for each and every stack in the solution. These decisions should be made in order, from top to bottom. The architecture of the 3-D framework has a structure called a "cloud" that is a placeholder for unmade decisions. The cloud represents all the different ways to provide one of the functions. For example, if a network designer decides to use TCP/IP as a transport protocol in the solution, but has not yet decided exactly what subnetwork protocol or products will be used to build the TCP/IP transport protocol, he or she can leave the TCP/IP transport cloud in place. Those detailed decisions can be made at a future time.

The Internet is a perfect example of a TCP/IP transport cloud. An intranet is also a good example of a cloud. The Internet is one network to which an organization connects; an intranet is a network that exists inside of a corporation. An intranet would start as a cloud, but it would be replaced by a solution design that can be implemented to provide Web-based applications to users. The Internet would probably stay a cloud in a solution design, because designers usually do not care how the Internet is built. They do not know or care how many routers their solution will use. They just want to use the Internet as a connection cloud to other organizations. Many solution designs in place today were drawn with clouds, each usually labeled with the function that it provides. For example, it is very common to see a circle that connects two boxes together in a solution design. This circle, or cloud, could be labeled "token ring" or "SNA" or "e-mail." These are examples of specific clouds for different decision points: "Token ring" is a subnetwork cloud, "SNA" is a transport cloud, "e-mail" is an application cloud. When these clouds are used in diagrams, no mention is made as to the specifics that will deliver the chosen function. The decision is left to others in the organization who have responsibility for that piece of the puzzle.

Figure 4:
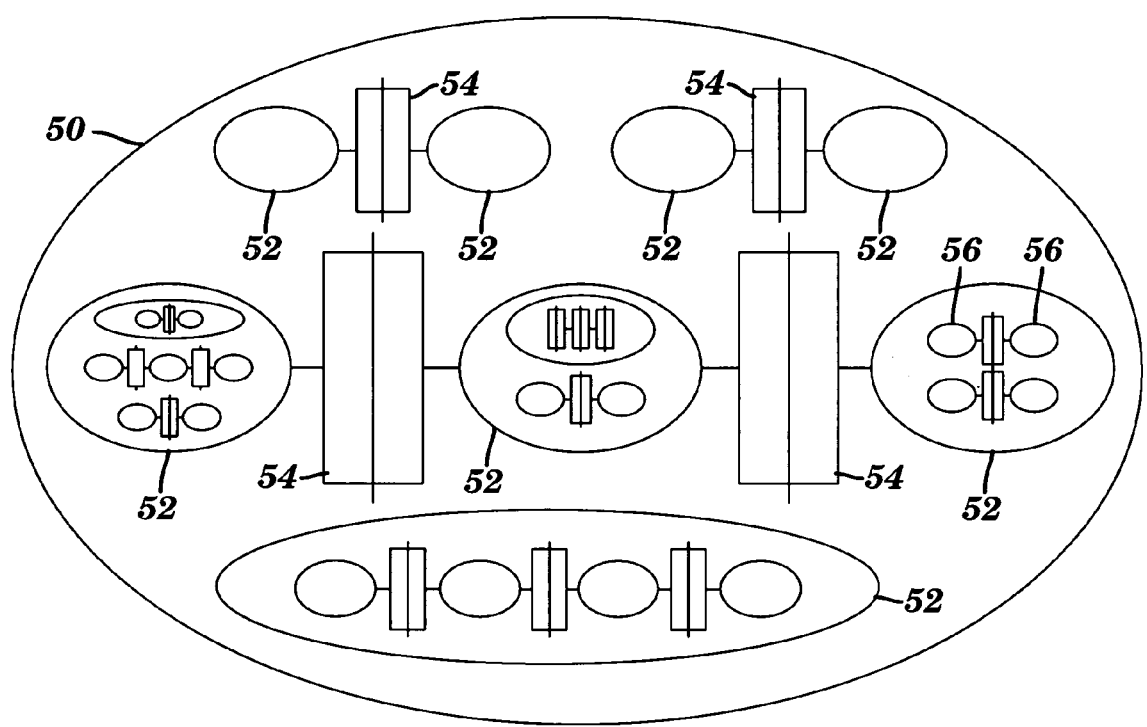
FIG. 4 depicts a solution comprising clouds.

The 3-D aspect of the cloud comes in the sense that it contains all the ways to build a particular function. If one could pick up a cloud and shake it, one would hear pieces of the solutions rattling around inside. For example, FIG. 4 depicts a 3-D framework cloud 50 containing other clouds 52, gateways 54 and "configurations," which comprise strings of clouds and gateways. There is a cloud type for each major decision, and furthermore there is a cloud for each chosen function within the cloud type. There are SNA, TCP/IP, Ethernet, ATM, e-mail, and Web browser clouds. The gateways 54 transform one cloud's function to another cloud's function. These clouds can be replaced by still other strings. Higher-layer cloud types contain configurations comprised of the next lower-layer cloud type. In other words, clouds can be nested inside configurations. For example, a transport cloud contains configurations comprised of gateway stacks connecting subnetwork clouds 56. These subnetwork clouds 56 may contain configurations comprised of gateway stacks connecting interface clouds. As decisions are made, these clouds are replaced with chosen configurations. The clouds are simply placeholders for unmade decisions.

By utilizing clouds, parts of a solution that the designer is not concerned with can be ignored. A designer of a higher-layer application may not be concerned with which interface type a device will use: fiber or copper wiring, for example. This designer may not know or care how many network devices are in the solution. He or she can leave these decisions to other people in the organization. These decisions would remain as clouds to the application designer; a networking specialist could fill them in when needed. It works the other way around, also. Network designers may not be concerned with exactly which applications are going to use their networks. They may be building a utility network that multiple applications will use. In this case, the network designers can ignore the higher layers (business need and application) of the decision process and concentrate on the decisions over which they have control.

Top-Down Guided Decision-Making Process

The first major benefit of a 3-D solutions-oriented approach is that the framework guides its users through the decision clouds until they get to the desired solution. This guided approach allows solution designers to see the results of their decisions right away. If they decide to use a particular function, the framework will tell them what possible configurations can fulfill that particular function. The guided approach ensures that the designer has configured a solution that will work. All the decisions that affect a solution will be thought through in the correct order. Product decisions will not be made before functional decisions are made; product decisions will be based on the required functions of the higher layers and on the number of required interfaces, price, processing power, etc.

Generic-to-Specific Choices

The next major benefit of the 3-D framework is found in the way choices are made, from the generic to the specific. This is the approach most people use to make a decision. Decision trees are more generic at the top and more specific at the bottom. For example, a person may want a companion to spend time with a generic need. He could invest time in a friend, or join a social program, or buy a computer and get on the Internet, or adopt a pet. Each choice moves the person toward a specific decision. If the person decides to adopt a pet, he or she could get a dog, or cat, or fish. If the person decides on a dog, he or she could get a poodle, a Doberman, or a bichon frise. Each decision brings him closer to his solution. The 3-D framework implements this in three ways:

1. Generic clouds are replaced with specific configurations.
2. Generic stacks are replaced with specific stacks (more layers filled in).
3. Generic characteristics are replaced with specific characteristics.

Generic Clouds to Specific Configurations

Many times designers will want to use a particular function in their design because of the benefits it provides. For example, some subnetwork protocols are faster than others. Some are more standards-based than others. Some applications are ubiquitous, which means that programmers are more readily available to write the applications. The ability to replace a functional cloud with a configuration that supports the function is very important. This allows the user to start with a generic choice and move toward a specific choice. The choice of configurations is based upon the gateway devices and the number and type of clouds in the configuration.

Generic Stacks to Specific Stacks

The second way the 3-D framework allows users to move from generic to specific is in the way decisions are stored inside the gateway stacks. As configuration choices are made to replace clouds, the generic stacks for the gateway devices that connect the clouds are replaced by stacks with more layers filled in.

Generic Characteristics to Specific Characteristics

The third way that designers move from generic to specific choices is in the values of the product layers: hardware, software, adapter cards, and cables. Designers do not want to make product decisions until all the requirements are known. They may know that they want to use PC-type hardware for one device in the solution, but they are unsure of how much memory they need or what the speed or size of the PC will need to be. Therefore, the designer can use a generic piece of hardware, called a PC, during the functional design phase. When actually making product choices, the designer can replace the PC hardware layer with a specific model of a PC, such as an Aptiva* Model 32E. Or the designer may need an Ethernet hub somewhere in the design, but he or she does not know how many ports or what type of management is needed. Therefore, he or she can leave the generic Ethernet hub hardware layer intact until the point in the design where the number of ports and the management type are known. The generic hardware layer can then be replaced with the specific model number of the chosen Ethernet hub. Generic software products can be replaced with a software layer that uses a specific version number of that software product.

Interconnectivity Knowledge

Another benefit of this approach is in the confidence that the 3-D framework gives its users in knowing that the designed solution will work. This level of confidence comes from the following three features of the framework:
1. Configurations are strings of stacks that work together.
2. Gateways are two stacks in a valid partnership.
3. Stacks are built following rules that ensure the layers will work together.

Configurations

The clouds are placeholders for configurations, which provide the function that the cloud represents. If the user knows all the choices for how to provide a certain function, the user can make a better decision. For example, a vacationing family, traveling on the highway, decides to eat lunch at a hamburger restaurant. After lunch they get back on the highway and see a taco stand. If they had only known, they could have chosen to eat there. The configurations inside the cloud represent all the possible ways to provide the cloud's function. The user can be assured that he or she did not miss any solution choices. Further, the user can be assured that the configurations are valid. The clouds and devices that make up the configuration represent a workable solution. This is guaranteed because the strings are built following rules that ensure that the application, transport, subnetwork, interface, and cable protocols all agree before two stacks are partnered across a cable.

Gateways

Stacks are partnered together internally to form gateways. The 3-D framework ensures that the two stacks will work together. The two stacks represent different sides of the same device-traffic flows into one and out the other. These stacks are like facets of a gemstone. They represent all the functions that a particular set of products can perform. Not all stacks that have the same set of product layers can be gateway partners with each other. Product knowledge experts have to confirm that two stacks can form a gateway. For example, a valid stack could be a router with the correct level of software running TCP/IP over token ring subnetwork protocol using a copper cable. A second equally valid stack is a router with the correct level of software running IPX (Internetwork Packet Exchange) transport protocol over an Ethernet subnetwork using a fiber cable. These are both valid stacks that share a common set of product layers. That does not mean that the router can necessarily transform TCP/IP over token ring to IPX over Ethernet. Only someone who understands these products can guarantee that these stacks will work together to form a gateway. In practice, the only guarantee that something will work is to try it in a test lab or a customer's production network. We discuss how the 3-D framework supports this expectation in the next section.

Stacks

The individual stacks contain knowledge of how the layers within the stack interact with each other. These stacks represent all the different functions that a set of product layers can perform. One set of product layers will perform many functions that are based on the higher layers of the stack. Stacks may all share the same set of products but each performs a different function. The function that a particular set of products performs is based on the capabilities of that product set. For example, some products, like hubs, switches, and repeaters, only work at the subnetwork layer. Some products, like routers, usually work at the transport protocol layer. A function of the 3-D framework, discussed in the next section, verifies that the product layers in a stack will deliver the functional layers in that stack. We also discuss how the 3-D framework creates all known stacks.

Detailed Product Knowledge

One further benefit is that solutions can be built either from the top down or from the bottom up. The top-down approach answers the question: "What products do I need to buy to provide these functions to meet my business need?" The bottom-up approach answers the question: "I have this set of products already installed in my network. What else can I do with them?" This question is very common. Most designers do not design in a vacuum; they design based on what they already have installed. They may want to know what other functions can be added to this mix of products. The 3-D framework allows the designer to start at the top and work down to the bottom layers. It also allows a user to define a set of products and determine what other functions that set of products will perform.

The 3-D framework incorporates the Open Blueprint structure, guides users in design, and gives a level of confidence that the product choices will provide the required functions and that the strings of devices will work. It allows designers to work with only the pieces of the solution over which they have some control. It allows designers to pass their proposed solutions from one group in an organization to another group in order to continue the design process. It is a different way to view the world, but it models the reality of the very complex information technology industry. In the next section we discuss the 3-D framework architecture.

Architecture for the 3-D Framework

Blueprints in general and how they are used in multiple industries have been described above, as well as a three-dimensional approach that would allow the solution designer to make better decisions. Described next is the 3-D framework's architecture, which may be implemented in a PC-based solutions advisor tool (using e.g., Borland's ObjectVision, REXX [Restructured Extended Executor] programs, SQL [Structured Query Language] queries, and IBM's DB2* [DATABASE 2*] databases). This architecture describes how the different pieces of the 3-D framework can be built and put together. The solutions advisor tool implements this architecture.

The 3-D framework architecture has two main goals: (1) to model distributed network solutions, and (2) to offer designers all the possible choices for solutions while guiding the decision-making process.

The second main goal makes the 3-D framework unique in that it attempts to know all the answers. Storing all the answers in a retrievable format is a problem. One would want to be able to retrieve a solution based on product or functional characteristics of that solution. For example, a designer may want to find a solution that uses TCP/IP transport, Ethernet subnetwork, fiber cabling, and an e-mail application. These characteristics would become search arguments used to retrieve potential solutions. One approach is to store a solution as a series of product and functional characteristics in a long string. Each string of characteristics would represent one solution. Assuming there was a reasonable limit to the number of devices in a string, this approach would not have an infinite number of configurations to store, but it would easily become an unmanageable number. Also, the search engine to retrieve a solution would require that each and every string be searched to find a match. There would be no way to guide the user through the six decision points that were mentioned earlier.

The approach used for the 3-D framework is to store a set of information in a structure and then refer to that set of information in a higher-level structure. This greatly reduces the number of solution strings that are created, stored, and retrieved. Solutions are broken down into the smallest possible components. These components are put together into stacks, the stacks are put together into configurations, the configurations are put into solutions, and the solutions are put into networks. This approach allows the creation, storage, and retrieval processes of the solutions advisor tool to be broken down into manageable sizes. This approach also makes decision points a natural part of the process. It allows the 3-D framework and the solutions advisor tool to return to the users a smaller number of possible choices. It is hard to make a choice when there are hundreds to choose from. The concept of decision trees, starting with the generic and moving to the specific, is used in the solutions advisor tool. This reduces the number of stored solutions.

Figure 5:
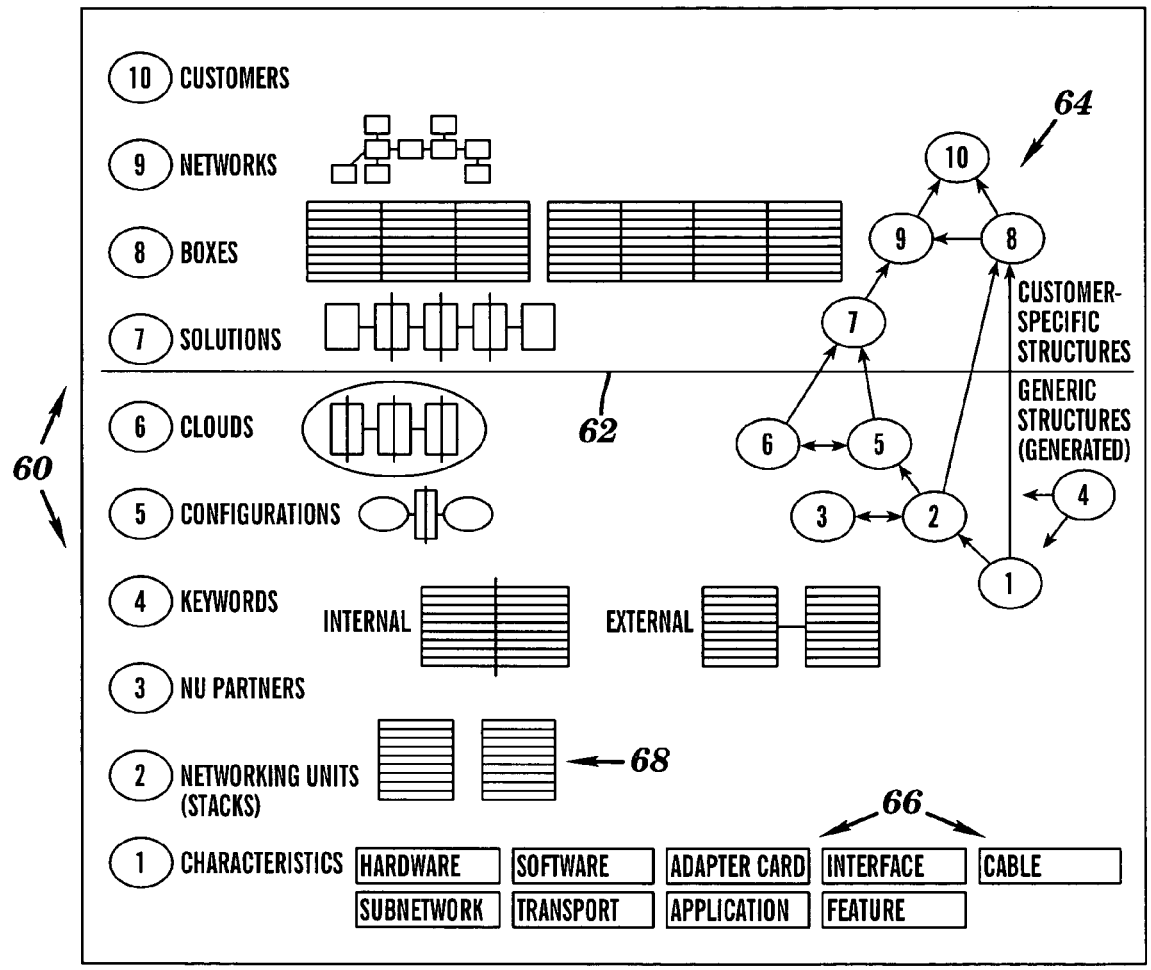
FIG. 5 shows the major concepts of the solutions advisor tool.

The 3-D framework accomplishes its two main goals by using many structures to hold all the information needed for a user to design a solution. These structures are implemented by the solutions advisor tool in the form of databases. FIG. 5 shows the major concepts of the 3-D framework in one diagram, which are described from bottom to top. It is understood that the algorithms and detailed data structures for implementing the architecture, as well as the solutions advisor tool could be readily implemented by one skilled in the art.

There are ten primary structures 60 in the 3-D framework architecture, which are labeled on the left side of FIG. 5 as 1-10 in a hierarchy. On the right side is a diagram 64 that shows how these structures interact. The horizontal line 62 across the middle of the diagram divides customer- or user-specific structures above the line, and generic structures available to all users below the line. This line 62 represents the reality that every customer network is different, while they all have the same set of products and functions from which to choose.

Structure 1: Characteristics

Characteristics are used to describe the details of a solution. They are also used as keywords that the search engine uses to return solutions. Characteristics 1 are the lowest common denominator of all solutions. There are nine types 66 of characteristics that closely match the layers in the extended framework stack introduced earlier. "Business need" is not a database characteristic type, even though it is a layer in the framework stack. Business needs are so specific to an organization that there is no way to standardize them and store them in a database. Also, some business needs are so complex that many concurrent solutions will need to be developed to support their functions.

All the other layers are based on some standard repeatable function or product. The new characteristic type that does not match any framework stack layer is "feature." This is used for miscellaneous comments that can be attached to a stack of characteristics. The lower characteristic types (product characteristics: hardware, software, adapter cards, and cable) are products that can be purchased. The higher characteristic types (functional characteristics: feature, application, transport, subnetwork, and interface) are functions that are delivered by the products.

Each of the nine characteristic types 66 is stored in a separate database in the solutions advisor tool. For example, the hardware database holds information such as product number, model number, revision number, number of interface slots, etc. The product number is usually four digits and represents a piece of hardware that performs specific functions. The model number is usually three characters and usually represents the size of the product. This may comprise very detailed information that describes the hardware product itself. If the database were fully populated, there would be one entry for each and every different piece of hardware.

Each entry is assigned an identifier that is referenced by higher-level structures. There is also a way to create a generic, or primary, characteristic that represents all of its more specific, or secondary, characteristics. For example, a generic token ring adapter card could be defined that would represent all the specific token ring adapter card characteristics. The difference between the specific token ring adapter cards is in their performance or number of interfaces, not in the function they perform. Therefore, the generic token ring adapter card characteristic can be used in the higher-level structures to represent any of the token ring adapter cards.

This reduces the number of solutions that a user will see. It also allows the user to make the specific token ring adapter card choice after a functional solution has been found. This specific choice can then be based on price, performance, or availability. Values for product characteristics-hardware, software, adapter cards, and cables-automatically have aliases associated with them. Hardware part numbers become aliases for hardware device numbers. Feature codes are aliases of product numbers. This is useful to users who want to search for a solution using a part number, feature code, or product number.

Some characteristics require special treatment. For example, entries in the interface database have a field to hold the partner interface. Some interfaces, such as RJ45, come in male and female forms. There are two entries created in the database for RJ45, one male and one female, that refer to each other as partners. This information is used to verify that the gender of the cables matches before the stacks containing them are defined as partners. The solutions advisor tool is also concerned about the function that the interface performs. For example, Ethernet hubs and adapter cards both use female RJ45 interfaces, but one is on an adapter and the other is on a hub. The interface characteristic contains not only the physical type of interface, but also the gender and the logical function of the physical interface (in this example, hub interface vs adapter card interface).

Another special case is the cable characteristic type. It is defined with two interfaces: left and right. This is used to make sure that this cable can be used to connect two stacks together using the correct interfaces. This interface information is also used by a program in the solutions advisor tool that creates other cable database entries by concatenating cable entries together. In other words, there are cables that are formed by connecting multiple smaller cables together.

Application characteristics, some transport characteristics, and some subnetwork characteristics have both a client and a server form. Some subnetwork protocols, such as SDLC, have a client side and a server side. The solutions advisor tool ensures that a stack with an SDLC client cannot connect to another stack unless it uses SDLC server protocol. Stacks with client application characteristics can communicate only with stacks that have partnering server characteristics. The transport characteristics identify which transport protocols are routable or bridged. The functional characteristic types, application, transport, and subnetwork, are also used for the names of clouds.

These characteristics would be created by a product knowledge expert. The existing solutions advisor tool uses a minimal number of characteristics for testing and proof of concept. The more knowledge the tool has, the larger the number of solutions it can create. Once a product it is entered into the database, only product updates would have to be entered. There would be a substantial amount of work to, e.g., get all of IBM's products entered into this type of database, but the rewards would be significant. The tool would still be useful even if a small number of products were entered, because placeholder characteristics could be entered to represent the functions of the missing products. Older products that are not marketed would be usefull in the database, because customers still design solutions that cross those older products. Other vendor products could be entered as well. Also, interoperability options would be created using a mixture of vendors in one solution. These product characteristics would also be entered into a product database that holds information such as price, availability dates, withdrawal dates, and vendor information.

The functional characteristics would be entered only once. These entries would define the rules that the protocols, applications, and interfaces follow. These entries would be built by a knowledge expert who understands the intricacies of the particular function. The expert may be an application designer or a protocol architect. A product using a standard-based protocol must follow rules for that standard.

Structure 2: Networking Units

Figure 6:
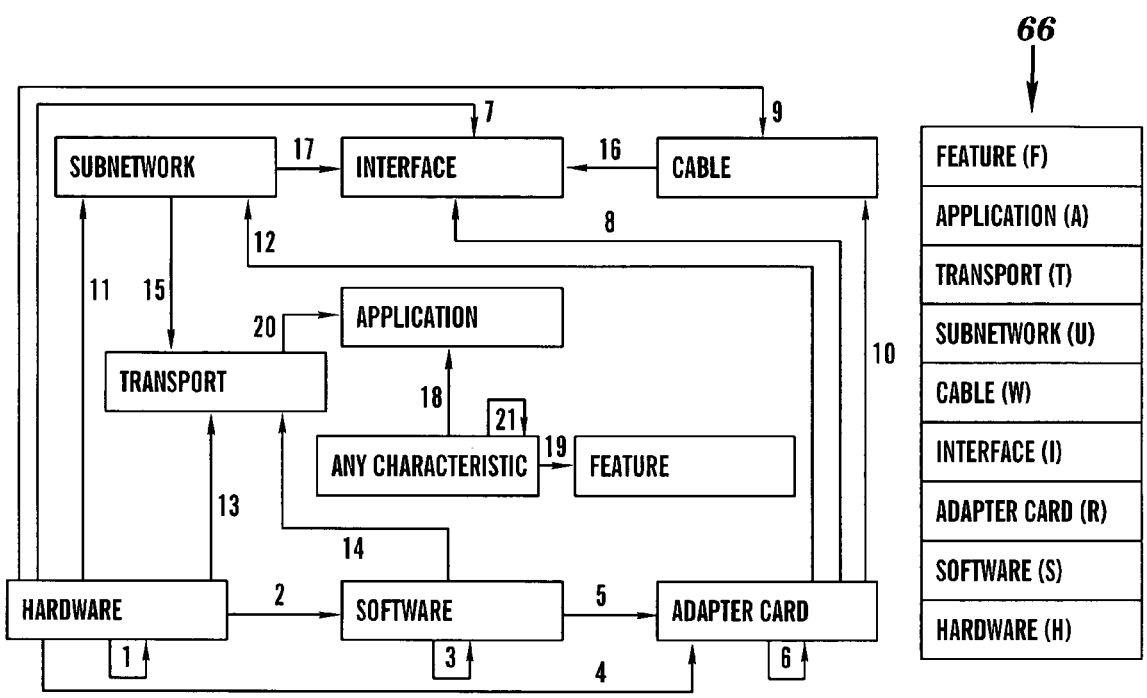
FIG. 6 depicts network unit relationships.

Networking units (NUs) 2 are the extended framework stacks 68. The term was chosen because the stack provides one unit or piece of a solution. An NU is a collection of characteristics. NUs are generated by the solutions advisor tool and confirmed by product knowledge experts. NUs represent all the different functions that a set of products can perform. The NUs are a collection of layers that represent a facet of a product. They are generated by the tool by following relationships between the characteristics. These relationships are displayed in FIG. 6. Each of the nine characteristic types 66 has a single-letter abbreviation.

The relationships define how the layers interact. The product knowledge expert enters these relationships for each product. The arrows show how one characteristic determines the other characteristics with which it can work. The numbers in the diagram represent the order that the generator follows as it creates the NUs. For example, Arrow 1 points from hardware to hardware. This is used when one piece of hardware can support another piece of hardware inside one NU or stack. For example, a PC supports a display. Both are pieces of hardware and a display is usually required with a PC. Arrow 2 points from hardware to software. For example, hardware for a router would point to software that is required for a router. These arrows define prerequisite relationships. For example, the transport protocol choice is based on the hardware, software, and subnetwork choices. The hardware characteristic points to every other characteristic, because it is the basis for every NU.

These layer relationships allow the NU generator in the solutions advisor tool to create all the possible combinations of layers that represent all the possible ways to build a stack. This information is useful in determining the product requirements to create an NU that delivers certain functional characteristics. The layers allow the solutions advisor tool to answer questions such as: "What version of software x works with hardware y?" or "What products are required to allow us to use a subnetwork protocol of ATM over a copper RJ45 interface?" Product knowledge experts know the answers to these questions. Designers need to know the answers as well. These layer relationships guarantee that all possible valid NUs are generated by the tool.

Most NUs that are stored in configurations contain generic product characteristics that represent the specific products. This reduces the number of possible configurations. The generic product characteristics can be replaced with specific product characteristics at the end of the solution design process. For example, there could be an NU that represents a PC with Microsoft Windows using a modem running SLIP (Serial Line Internet Protocol) to get on the Internet using the HTML application. This NU contains generic hardware, generic software, and generic adapter card characteristics. It can be used in a configuration and will represent any PC with any version of Microsoft Windows and any modem. This is valid because any PC that supports Microsoft Windows and a modem can perform this function. Later, as the customer decides on a version of Microsoft Windows, a modem manufacturer, and a brand of PC, these generic characteristics can be replaced with more specific ones.

Figure 7:
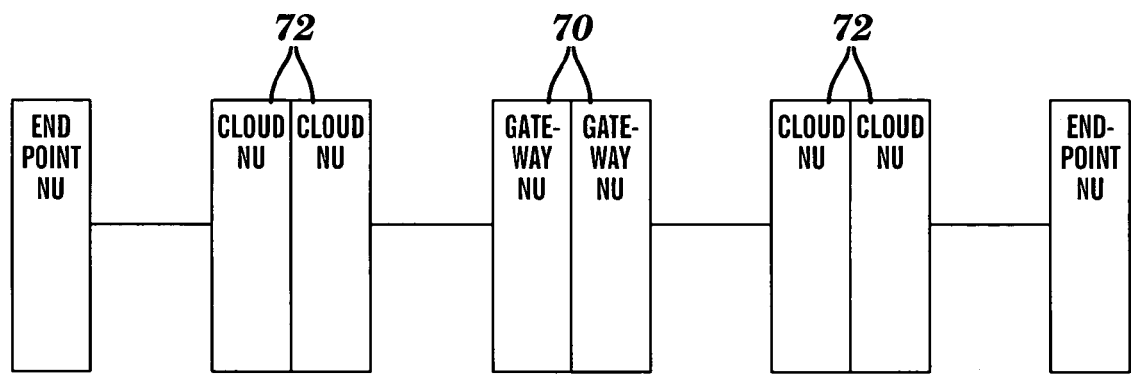
FIG. 7 depicts solutions represented by a string of network units.

FIG. 7 depicts a configuration comprising generic gateway NU's 70 connecting cloud NU's 72. As depicted in the table of FIG. 8, there are 13 types of NU's. Only the first two contain any product characteristics; the first is used to represent end-point devices. Types 2-8 are gateway devices. Six of these are generic and are replaced by other NU types as functional decisions are made during the design process. The generic gateway NUs connect cloud NUs together in configurations. Types 9-12 represent cloud NUs (the clouds that were discussed earlier are represented using these four NU types). Solutions can be represented by a string of NUs as shown in FIG. 7. The clouds are replaced by other strings of NUs until the solution is represented by two end-point NUs connected via multiple gateway NUs.

The table in FIG. 8 explains the function of each of the 13 NU types. It also shows which characteristics are stored in each NU type, along with which configurations refer to these NU types. The last column contains information on what replaces each NU type as decisions are made during the design process. Cloud NU types are replaced by configurations, while gateway NU types are replaced by other gateway or product-specific NU types.

Structure 3: NU Partners

Referring again to FIG. 5, the next structure in the hierarchy 60 are NU Partners 3. The NUs are in partnership with each other in two ways: internally and externally. These partnerships allow the tool's generator to create valid configurations in the form of strings of cloud and gateway NUs. Internal partnerships between two NUs form one gateway device. External partnerships between two NUs are automatically built if the application, subnetwork, transport, cable, and interface characteristics match.

This external partnership models the real world in that two devices have to be running the same protocols across a common set of cables in order for them to communicate meaningfully. Many products in the marketplace today are emulators-they emulate another product's capabilities by running the same protocols. Very few devices are configured to know exactly which products are on the other end of a connected cable. Just as product layers, discussed earlier, follow a standard, these external partnerships also follow a standard. Typical product stacks start with an application layer creating a frame of information that is passed to the transport layer, where a header is added. The frame is then passed to the subnetwork layer, where another header is attached before it is passed as a packet to the physical layer, where still other headers are added. The packet then goes across the interface to the cable, to the other end of the cable, and through the partner's interface. The packet is then stripped of headers and sent back up the stack to the application layer. The 3-D framework matches this reality in the way the stacks are generated and in the way that external partnerships are created.

The tool can also generate potential internal partnerships. Product knowledge experts need to verify that these potential partnerships are valid. They know if a product can act as a gateway to transform a packet on one interface into a packet with characteristics matching the second interface of the gateway.

The tool's generators follow these external and internal partnerships of the cloud and gateway NUs to create valid configurations. Internal partnerships of generic NUs are based on the partnerships of which their specific NUs are capable.

Structure 4: Keywords

Keywords 4 are used by the solution designer to search for answers from the solutions advisor tool. Keywords can be used to find characteristics, layer relationships, NUs, configurations, and solutions. The keywords database also holds information that relates primary (generic) characteristics and NUs to their secondary (specific) characteristics and NUs. Aliases are defined here also. The keywords database is a structure that helps users find and build solutions.

Structure 5: Configurations

Configurations 5 are generated collections of NUs in a string that represents a valid concatenation of gateway device NUs and cloud NUs. These configurations provide a specific function, defined by the cloud in which the configuration resides. For example, there are thousands of ways to build a TCP/IP transport cloud. The distinction between all the possible configurations is dependent on what lower-level subnetwork protocols are used and is based on the type and number of gateway devices that are used. One of the simplest TCP/IP transport solutions is an Ethernet hub. More complex solutions use many and varied subnetworks, connected via switch gateway devices or router gateway devices. Regardless of the complexity inside these configurations, they all perform the same TCP/IP transport function. They would all be stored as TCP/IP transport clouds. These configurations will contain other lower-level subnetwork clouds. These subnetwork clouds represent all the configurations that provide that subnetwork function, such as token ring or Ethernet. Lower-level clouds are represented by NUs that live in configurations. These configurations are defined by the higher-layer cloud function that they perform.

These configurations are generated by the solutions advisor tool. There is a generator for each of the five cloud types. The configuration database holds strings of NUs and a functional characteristic that represents the cloud function performed by the configuration. The solutions advisor tool limits the lengths of the configurations depending on the type of cloud being generated. This will prevent the generation of configurations of unrealistic lengths. A longest configuration string in the tool may contain 26 NUs. This string contains seven clouds connected via six gateways. Each cloud is represented by two NUs and each gateway is represented by two NUs (2×7+2×6=26).

Configurations that live in a subnetwork cloud contain only gateway devices (usually hubs or repeaters). There are no clouds in the string because there are no cloud types lower than the subnetwork cloud. For example, an Ethernet cloud will contain only Ethernet hubs and repeaters.

Structure 6: Clouds

Clouds 6 are placeholders that represent all the configurations that can deliver the function that the cloud represents. Clouds are represented in configurations as two NUs. These cloud NUs are external partners to gateway and end-point NUs and internal partners to each other. There are five types of clouds: business need, application, transport, bridged, and subnetwork.

Business Need Cloud

Configurations that are stored in business need clouds contain strings of application cloud NUs (Type 12) and application gateway NUs (Type 8) that connect the application clouds together. The gateway devices can transform (move from) one application to another. For example, a user may use a Telnet application to gain access to a mainframe and then use a CICS application to gain access to some mainframe data. The mainframe is an example of an application gateway, because it transforms one application to another. The gateway and the two application clouds form a configuration that satisfies the requirements of the business need cloud.

Application Cloud

Configurations stored in application clouds contain transport cloud NUs (Type 11) and transport gateway NUs (Type 7). For example, an end user may use two transport protocols to gain access to a mainframe application. IPX transport protocol might be transformed to SNA transport protocol by a PC device. The PC device is the transport gateway that allows an end-point device using IPX to access another end-point device that uses SNA.

Transport Cloud

Configurations stored in transport clouds contain bridged cloud NUs (Type 10) or subnetwork cloud NUs (Type 9) and subnetwork gateway NUs (Type 5). The transport clouds represent the function performed by one transport protocol. For example, a typical TCP/IP transport protocol could use many subnetwork protocols connected via transport gateways (routers are examples of transport gateways). An end-point NU using token ring subnetwork may want to gain access to another end-point host NU using Ethernet. Token ring and Ethernet would be represented by subnetwork cloud NUs. This typical configuration would use a router to connect these two subnetwork clouds together.

Bridged Cloud

Configurations that are stored in bridged clouds contain subnetwork cloud NUs (Type 9) and subnetwork gateway NUs (Type 5). Bridged clouds are used in special cases to represent protocols where we need to know if the transport protocol is being bridged instead of routed. Token-ring source-route bridging is an example of a bridged transport protocol. Configurations that live inside the bridged cloud are subnetwork clouds connected via bridges.

Subnetwork Cloud

Configurations stored in subnetwork clouds contain only gateway NUs (Type 3)-they contain no cloud NUs. These configurations are typically strings of hubs or switches. Subnetwork clouds contain configurations that can contain lower-level cloud types. These lower-level clouds are not expanded into their configurations until a solution is created, when they are replaced by lower-level configurations by the designer as decisions are made.

All of the structures below the line in FIG. 5 are used by all designers. These structures are the building blocks for a solution. The characteristics represent products or functions. Layer relationships are used to build collections of characteristics called NUs. NUs are partnered and strung together to build configurations. Collections of configurations are represented by clouds. These are all generated from product-knowledge-expert input. Usually, product knowledge experts know their products very well, and they know how one product interacts with other products. They can recommend their products based on functional requirements of the solution. The solutions advisor tool can be used to gather this product knowledge from the experts and put the products together to form valid stacks, configurations, and solutions.

Structure 7: Solutions

The solution structure 7 is the first above the line 62 in FIG. 5. The structures above the line are all customer-specific. Solutions are strings of NUs that have been built by the designer using the solutions advisor tool. The typical solution shown in FIG. 5 contains two end-point devices connected by a string of gateway devices. These solution strings can contain end points, gateways, and possibly clouds. Some of the clouds may have been replaced by configurations. Each solution in the customer's network could be designed this way. A typical customer may require dozens of solutions in his or her network. Each solution could be designed and then stored in a customer database.

Figure 9:
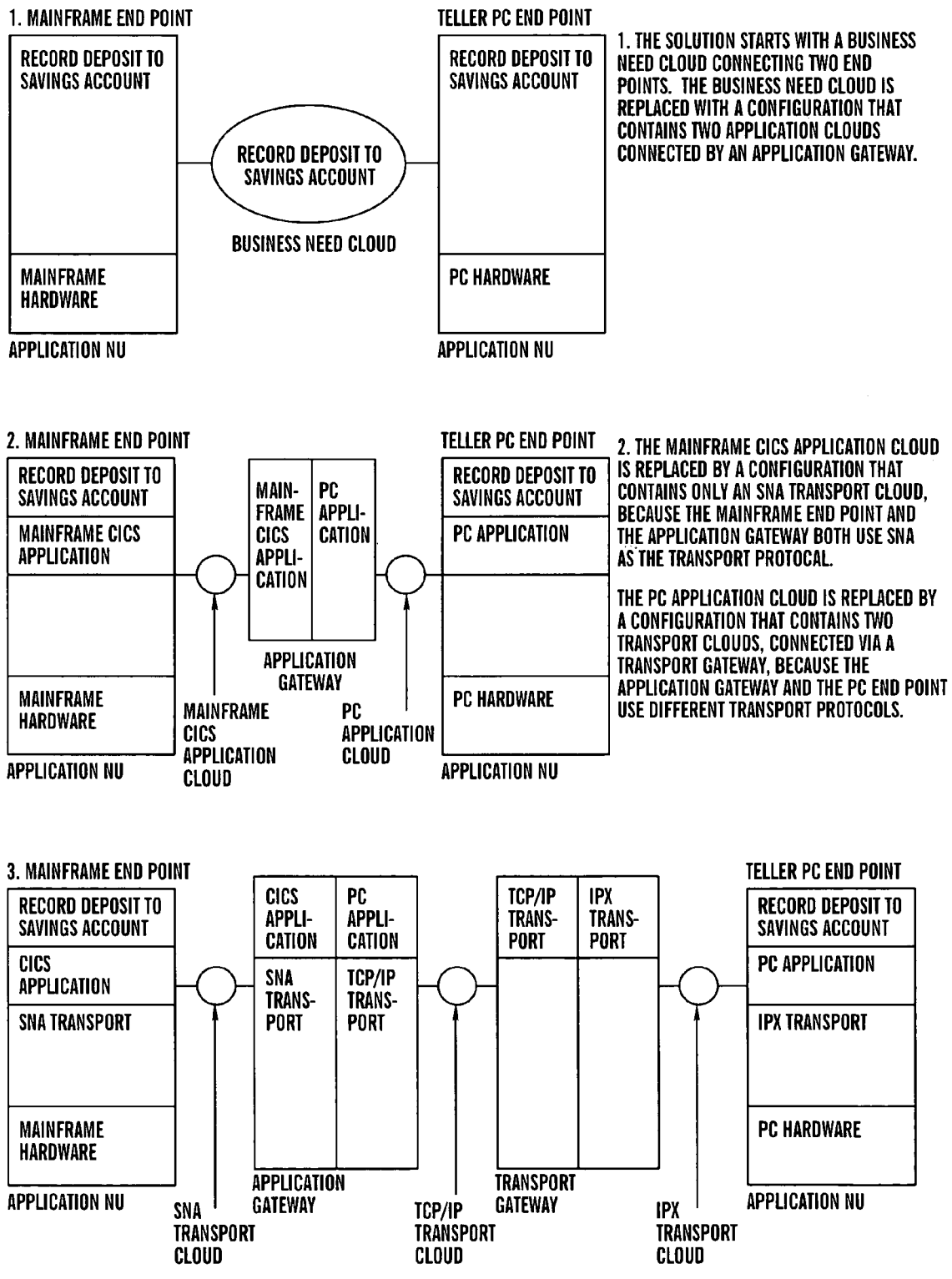
FIG. 9 depicts an overview of an exemplary design process.

A typical solution could start with a business need cloud (see FIG. 9). For example, a bank may have a solution under design for a teller to update a client's savings account with a deposit transaction. The business need cloud would connect two end points. In this case, the teller's PC and the mainframe where the client's database information is stored are the end points. At the beginning of the solution design process the solution simply shows a teller PC connected to a business need cloud connected to a mainframe end point. As the designer works through the decision process, he or she can replace this cloud with a configuration that uses the designer's chosen applications.

The business need cloud could be replaced by a configuration that contains two application clouds connected by an application gateway. The first of these application clouds could represent a mainframe CICS application and the second could represent a PC-based application, such as Telnet. The gateway between the two application clouds represents a device that transforms the PC application to the CICS application. These devices typically run some kind of middleware software.

Next, the two application clouds can be replaced with configurations that contain transport clouds. The correct configuration to use is dependent on the designer's goals and maybe on the existing network that must support the solution. As these decisions are made, the gateway and the application clouds can be replaced with more specific devices and configurations that contain more specific choices. The first application cloud could be replaced by a configuration that contains a TCP/IP cloud and an IPX cloud connected via a transport gateway device. The second application cloud could be replaced by a configuration that contains multiple TCP/IP clouds connected via router gateway devices. As the designer makes more specific decisions, he or she works down the framework stack. These decisions are temporarily stored in clouds and in generic gateway NUs.

In our banking example, the solution may be complete. The designer may not need to expand the SNA, TCP/IP, and IPX transport clouds further-the functions may exist in the designer's network. If the designer wants to make product decisions that will support the transport clouds, then he or she can replace the transport clouds with configurations that contain either bridged or subnetwork clouds that represent the chosen subnetwork protocol. And further, these clouds can be replaced with configurations that contain specific product NUs, such as hubs or switches.

Figure 10:
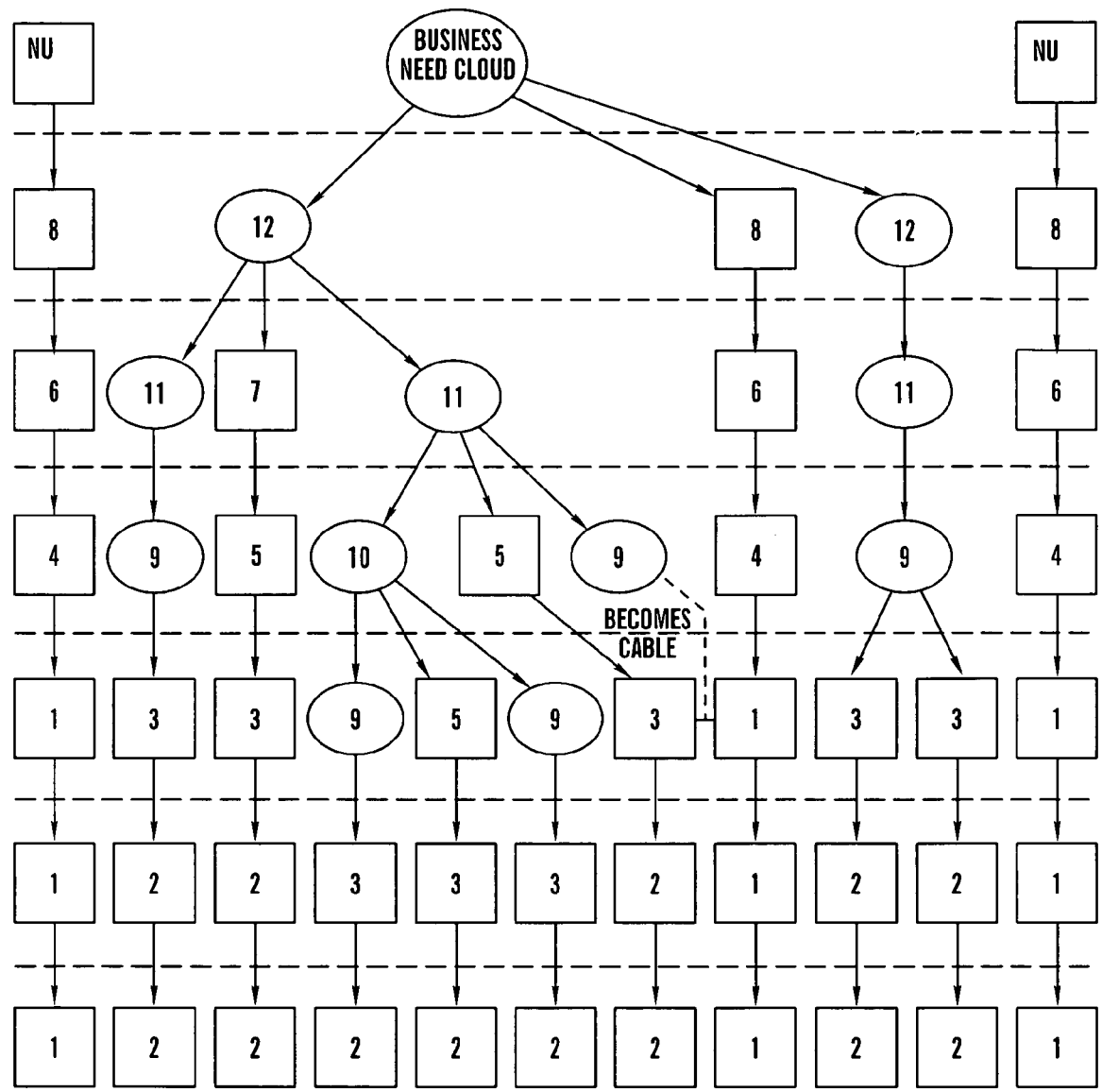
FIG. 10 shows a design process where clouds are replaced by configurations as decisions are made.

So, beginning with two end points (a PC and a mainframe) to be connected to satisfy some business need, the designer ends with a complete list of all the products that would be required to satisfy that business need and all the lower-level requirements determined along the way. FIG. 10 shows how clouds are replaced by configurations as decisions are made. Here circles represent clouds and rectangles represent NUs. Each circle and rectangle is labeled with the NU type used at that point in the decision process. Arrows show a cloud being replaced by a configuration that contains lower-layer clouds and gateways. The arrows also show how NUs are replaced by more detailed NUs during the design process. Designers can keep replacing clouds and NUs until they have a string of NUs of Types 1 and 2 (the product NUs), or they can stop at any point and leave a cloud in the solution as a placeholder.

Structure 8: Boxes

Figure 11:
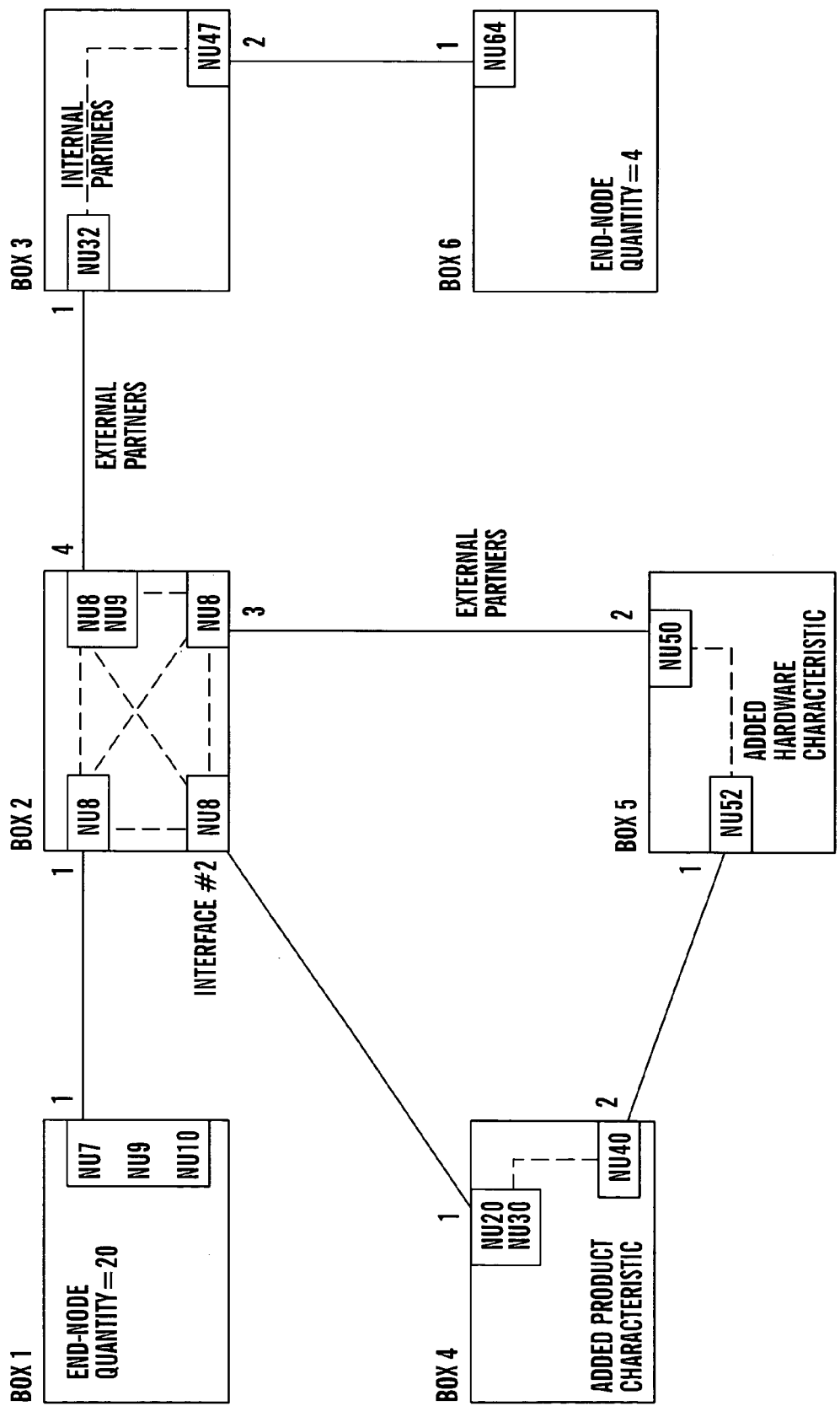
FIG. 11 shows how each network unit is a different facet, or interface, into a box.

Boxes 8 represent real, physical pieces of hardware. They are collections of NUs, all with the same base product characteristics. As shown in FIG. 11, each NU is a different facet, or interface, into the box.

Boxes are customer-and location-specific. The designer determines the location of the end points, gateways, and clouds, then puts the NUs from each solution into these boxes. Some solutions will share the same physical boxes. After each NU from each solution is put into a box, the box structure looks like a list of products to be purchased. It is now very similar to a product configurator listing. It lists the hardware, software, adapter cards, and cables that must be available for the box to provide all the functions required for each solution that crosses the box. One can buy a box, but not an NU. Boxes usually contain very specific product characteristics. One box description may represent a larger quantity of boxes. For example, one office could contain 20 PCs that all provide the same function; one box can represent all 20 PCs.

Structure 9: Networks

Networks 9 are collections of boxes. The network database can be used to answer questions such as: "What products are installed at a specific location?" or "How many cables do I need to order for the switch at this location?" or "How many token-ring interfaces do I have on this router?" It can also be used to create wiring diagrams that specify which cables interconnect specific boxes.

Structure 10: Customers

The customer database holds information such as customer number, contacts, addresses, etc. Structure 10 in FIG. 5 shows that the network and boxes are customer-specific entities.

Reviewing the 3-D framework and the solutions advisor tool can be done from top to bottom. The tool allows a designer to support multiple customers. Each customer has a network that supports multiple concurrent solutions. Many of these solutions work across the same set of installed products or boxes. The boxes have multiple interfaces and are connected via multiple cables. The solutions are comprised of stacks connected end-to-end. These solutions cross functional clouds. The clouds contain stacks that deliver specific function. These stacks are partnered together across the cable if they share common protocols and cables. They are partnered internally if the products work together. Relationships between product and functional layers determine if the stack is capable of delivering a set of functions. There is a finite number of possible stacks that a given set of products can build. These layers are definable based on product and functional characteristics. These products and functions can be categorized and their relationships defined.

Figure 12:
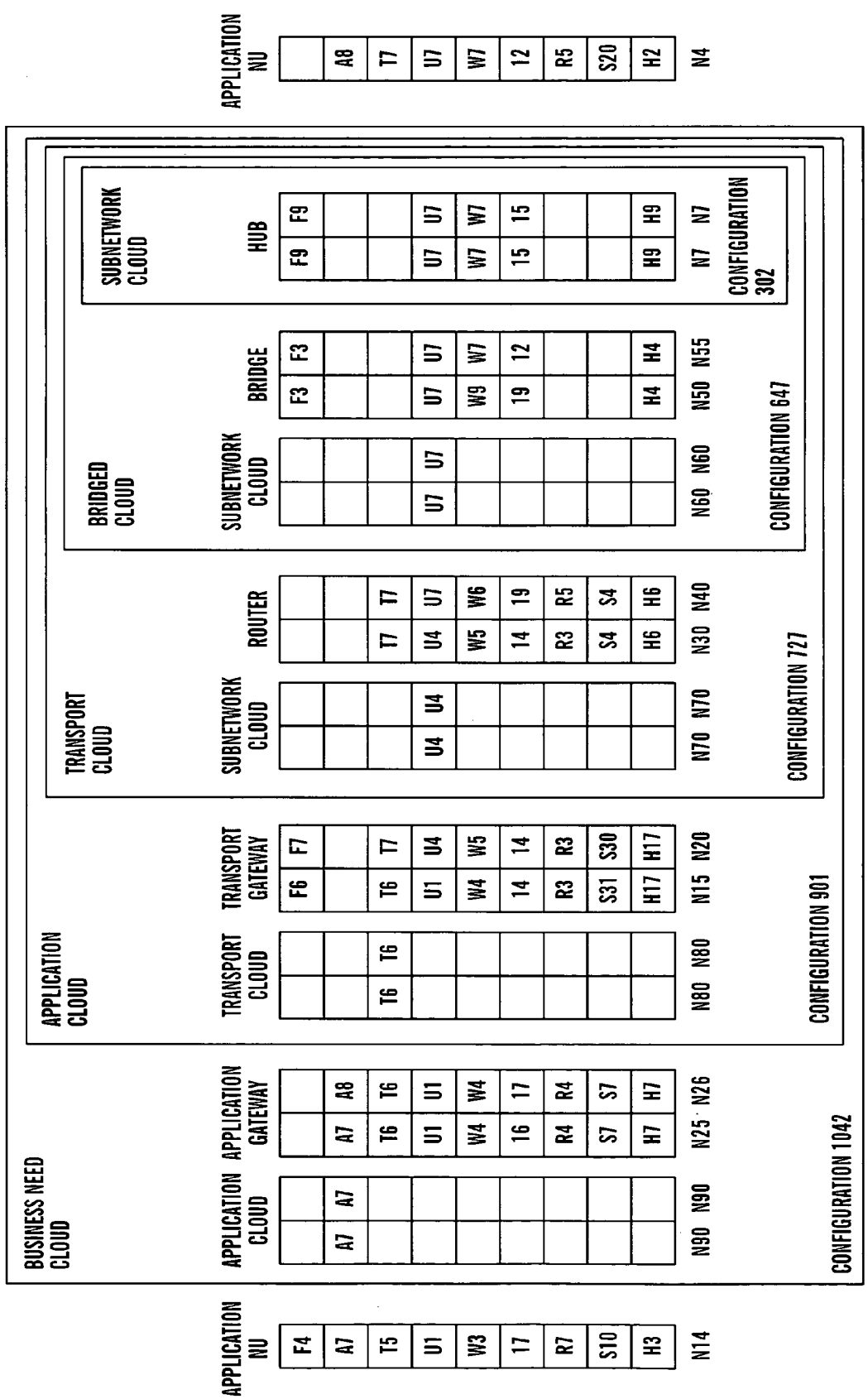
FIG. 12 shows one sample solution with two end-point network units connected via clouds and gateway network units.

FIG. 12 shows one sample solution with two end-point NUs (N14 and N4) connected via clouds and gateway NUs. It shows multiple clouds, gateways, configurations, NUs, and characteristics in one diagram. Each NU, characteristic, and configuration is numbered to represent one entry in its respective database. The end-point NUs were initially connected via a business need cloud. This cloud was replaced by Configuration 1042, which is comprised of two application clouds connected via an application gateway. The end-point NU on the left (N14) uses Application Protocol A7 to communicate across the A7 application cloud (represented by two cloud NUs labeled N90) to the application gateway (represented by N25 and N26). The end-point NU on the right (N4) uses Application Protocol A8. The application cloud that supports A8 has been replaced by Configuration 901, which contains two transport clouds connected via a transport gateway (N15 and N20). The transport gateway transforms Transport Protocol T6 to T7. The T7 transport cloud has been replaced with Configuration 727. This cloud replacement strategy is continued until just two end points are connected via multiple gateway NUs.

We have reviewed some of the detail that shows how the 3-D framework and the solutions advisor tool work. The tool follows the same rules and information flow that the IT industry follows. It may be written, e.g., using Borland's ObjectVision®. In the preferred embodiment, there are a plurality of screens that allow the user to enter characteristics and layer relationships and perform keyword searches for characteristics, relationships, NUs, partners, and configurations. The screens allow designers to generate NUs, partnerships, cables, configurations, and clouds. The tool can be used to build solutions, boxes, and networks for specific customers. Users can create reports on wiring charts, solution and product costs, and spreadsheets. These screens may, e.g., call REXX programs that create and query DB2 databases using SQL calls.

Examples of some of the practical uses for the tool follow. The tool can be used to answer questions at any point in the hierarchy discussed in FIG. 5. For example, the tool can answer the following questions:

1. What version of MRNS (multiprotocol routing network services) software will support TCP/IP over ATM?
2. What can I connect to my PC with an Ethernet RJ45 card?
3. How many devices support both an ESCON (Enterprise Systems Connection) channel and an ATM interface card?
4. Show me the options that I have for building an SNA network using frame-relay and 56 kilobyte-speed modems.
5. How many fiber strands do I need to install between two particular buildings?
6. What products are installed in the wiring closet on the 27th floor of this building?
7. Is it possible to convert from frame-relay to ATM?
8. Does this switch support DHCP (Dynamic Host Configuration Protocol) pass-through?
9. How much does this solution cost?
10. What products are required to allow a PC running IPX to sign on to a mainframe?
11. Can I run CICS over ATM?
12. Will DHCP work using a mainframe as a server?
13. What Netfinity* software runs on Windows?
14. What does the acronym "XPQR" stand for? (The answer: It does not stand for anything!)

The tool can also be used to design complete networks. Solutions can be created using keyword searches to find products, NUs, partners, configurations, and solutions. These solutions can be merged into one network and the tool will allow the user to build boxes to contain all the required products.

Figure 13:
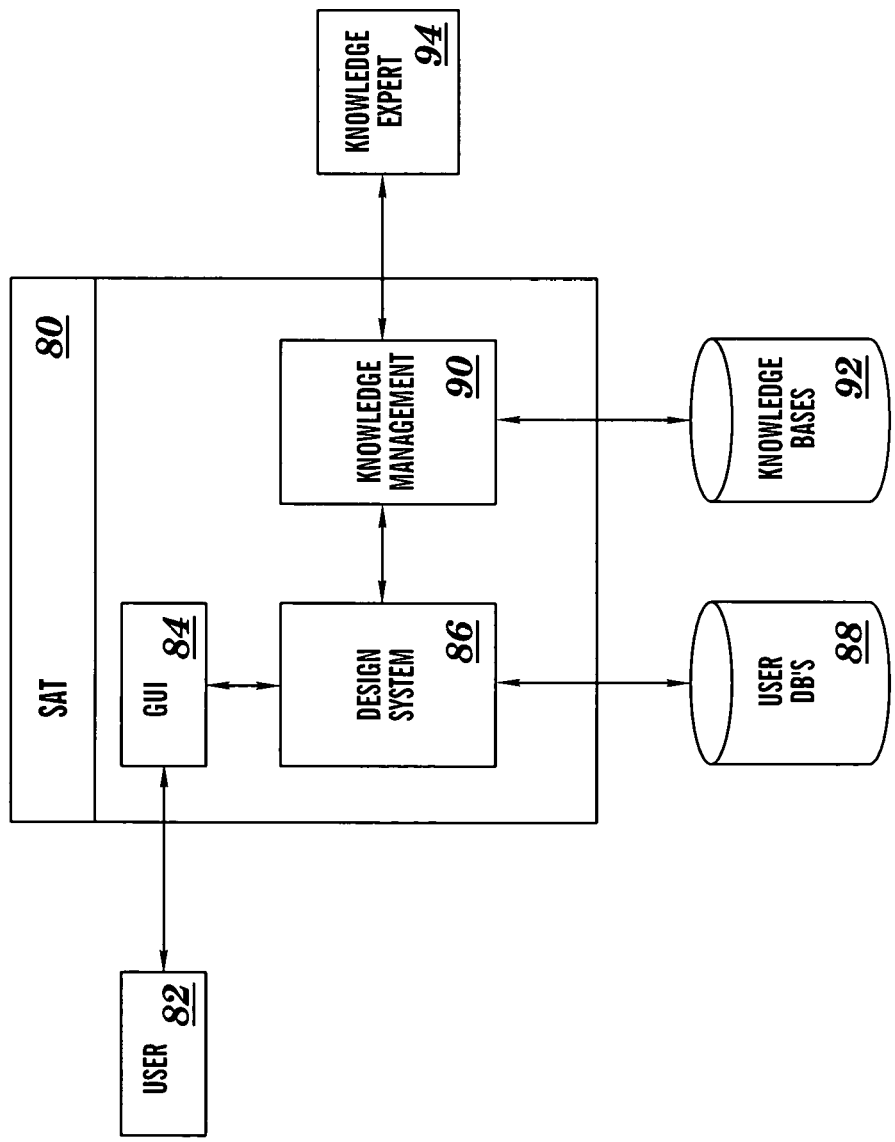
FIG. 13 depicts an overview of the solution advisor tool.

Referring to FIG. 13, a high level overview of the solution advisor tool (SAT) 80 is shown. SAT 80 includes a graphical user interface (GUI) 84 that allows a user 82 to interface with design system 86 to design IT solutions. Resulting designs, solutions, user information, etc., are stored in user databases 88. Knowledge management system 90 controls, manages and generates the IT information needed to design the IT solutions. The IT information is stored in knowledge bases 92 in a hierarchical format described above. Knowledge management system 90 may also be controlled and managed by input from a knowledge expert 94.

Design system 86 includes systems that guide user 82 through the design process. For instance, design system 86 may include a system for designing a solution using a generic cloud selected from one of the knowledge bases 92; a system for replacing the generic cloud with a set of more specific clouds; a system for replacing clouds with one or more configurations; a system for replacing a selected configuration with one or more network units; a system for replacing a generic network unit with a specific network unit; and a system for replacing a generic characteristic with a specific characteristic. User databases 88 include a solutions database; a boxes database, a networks database, and a customers database (see FIG. 5).

Knowledge management system includes systems for managing and generating characteristics, NU's, NU partnerships, configurations, and clouds. It also includes a keyword search system. Knowledge bases 92 include databases containing characteristics data, NU data, NU partnership data, keyword data, configuration data and cloud data.

It is understood that the present invention can be realized in hardware, software, or a combination of hardware and software. The components as described herein can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, module, mechanism or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system including a solution advisor tool for designing an information technology (IT) solution, comprising:
   a knowledge management system for generating and storing information in a hierarchical format, wherein the knowledge management system includes:
   a first knowledge base of characteristics;
   a second knowledge base that manages relationship information regarding the interactions of characteristics and defines all valid characteristic combinations, wherein each valid characteristic combination forms a network unit;
   a third knowledge base that manages information regarding the interconnectability of network units, wherein a valid combination of network units comprises a configuration; and
   a fourth knowledge base that manages information regarding sets of all possible configurations that can fulfill a predetermined function, wherein each set comprises a cloud; and
   a design interface system for generating the IT solution, comprising:
   a system for specifying the solution using a first cloud;
   a system for replacing the first cloud with a set of second clouds;
   a system for replacing a selected cloud with at least one configuration;
   a system for replacing a selected configuration with at least one network unit; and
   a system for replacing a generic network unit with a specific network unit.

2. The solution advisor tool of claim 1, further comprising a fifth database of keywords.

3. The solution advisor tool of claim 1, further comprising a sixth knowledge base of valid network unit partners.

4. The solution advisor tool of claim 1, wherein the characteristics comprise products and functions.

5. The solution advisor tool of claim 1, characteristics comprise generic products and specific products.

6. The solution advisor tool of claim 5, wherein the design interface further includes a system for replacing generic products with specific products.

7. A program product stored on a computer readable medium with executable instructions, which when executed provides a system for generating an information technology solution, comprising:
   a system for specifying a generic solution using a cloud selected from a plurality of clouds, wherein each cloud provides a set of all possible configurations that can fulfill a predetermined function that the cloud represents, and wherein each configuration includes a valid set of network units, and wherein each network unit comprises a set of characteristics;
   a system for replacing the cloud with at least one second cloud, wherein the at least one second cloud includes a more specific set of configuration details;
   a system for replacing a selected cloud with at least one configuration;
   a system for replacing a selected configuration with at least one network unit; and
   a system for replacing a generic network unit with a specific network unit.

8. The program product of claim 7, further comprising a system for replacing generic characteristics with specific characteristics.

9. The program product of claim 7, wherein the set of characteristics include products and functions.

10. The program product of claim 7, wherein the program product further includes a system for storing and managing information regarding the clouds, configurations, network units and characteristics.

* * * * *